(12) United States Patent
Gutknecht et al.

(10) Patent No.: US 9,462,817 B2
(45) Date of Patent: Oct. 11, 2016

(54) PROCESSES FOR MAKING CHEESE PRODUCTS UTILIZING DENATURED ACID WHEY PROTEINS

(75) Inventors: Jon R. Gutknecht, Delray Beach, FL (US); John B. Ovitt, Franklin, VT (US)

(73) Assignee: FRANKLIN FOODS HOLDINGS INC., Delray Beach, FL (US)

( * ) Notice: Subject to any disclaimer, the term of this patent is extended or adjusted under 35 U.S.C. 154(b) by 1178 days.

(21) Appl. No.: 13/037,292

(22) Filed: Feb. 28, 2011

(65) Prior Publication Data

US 2012/0219665 A1 Aug. 30, 2012

(51) Int. Cl.
| | | |
|---|---|---|
| A23C 19/05 | (2006.01) | |
| A23C 9/13 | (2006.01) | |
| A23C 19/032 | (2006.01) | |
| A23C 19/076 | (2006.01) | |

(52) U.S. Cl.
CPC .......... *A23C 19/053* (2013.01); *A23C 9/1307* (2013.01); *A23C 19/032* (2013.01); *A23C 19/076* (2013.01)

(58) Field of Classification Search
USPC ....................................................... 426/541
See application file for complete search history.

(56) References Cited

U.S. PATENT DOCUMENTS

| | | |
|---|---|---|
| 2,387,276 A | 10/1945 | Link |
| 2,436,498 A | 2/1948 | Strezynski |
| 3,431,115 A | 3/1969 | Biasi |
| 3,749,583 A | 7/1973 | Cox |
| 3,852,158 A | 12/1974 | Anderson |
| 3,929,892 A | 12/1975 | Hynes |

(Continued)

FOREIGN PATENT DOCUMENTS

| | | |
|---|---|---|
| DE | 3314551 C1 | 11/1984 |
| EP | 0368492 A1 | 5/1990 |

(Continued)

OTHER PUBLICATIONS

Almecija et al., "A flux enhancing pretreatment for the ultrafiltration of acid whey," Desalination, vol. 246 (2009) pp. 364-369.

(Continued)

*Primary Examiner* — Elizabeth Gwartney
(74) *Attorney, Agent, or Firm* — Jay M. Brown

(57) ABSTRACT

Process that includes: providing dilute aqueous liquid acid whey protein composition containing acid whey proteins; filtering dilute aqueous liquid acid whey protein composition, forming concentrated aqueous liquid acid whey protein composition containing acid whey proteins; combining together concentrated aqueous liquid acid whey protein composition and edible caustic composition in suitable proportions to result in substantially neutral pH; denaturing acid whey proteins at elevated temperature, forming concentrated aqueous liquid denatured acid whey protein composition; providing milk composition containing butterfat and substantial concentrations of native casein and whey proteins; combining together milk composition and concentrated aqueous liquid denatured acid whey protein composition, forming dairy mix containing butterfat and protein composition including native casein and whey proteins and denatured acid whey proteins; inoculating dairy mix with lactic acid-producing bacteria; culturing lactic acid-producing bacteria in dairy mix, forming curd and whey; separating curd from whey; and recovering curd as cheese product. Cheese product made by process.

19 Claims, 3 Drawing Sheets

(56) References Cited

U.S. PATENT DOCUMENTS

| | | |
|---|---|---|
| 3,998,700 A | 12/1976 | Reinbold |
| 4,020,186 A | 4/1977 | Edwards |
| 4,110,476 A | 8/1978 | Rhodes |
| 4,194,011 A | 3/1980 | Invernizzi |
| 4,232,050 A | 11/1980 | Rule |
| 4,293,573 A | 10/1981 | Bradley |
| 4,341,801 A | 7/1982 | Weissman |
| 4,397,878 A | 8/1983 | Koide |
| 4,402,986 A | 9/1983 | Sinkoff |
| 4,410,549 A | 10/1983 | Baker |
| 4,434,184 A | 2/1984 | Kharrazi |
| 4,518,616 A | 5/1985 | Czulak |
| 4,534,982 A | 8/1985 | Yoshida |
| 4,560,560 A | 12/1985 | Narimatsu |
| 4,569,846 A | 2/1986 | Ohzeki |
| 4,678,673 A | 7/1987 | Marshall |
| 4,724,152 A | 2/1988 | Baker |
| 4,732,769 A | 3/1988 | Sozzi |
| 4,749,584 A | 6/1988 | Wirchansky |
| 4,837,035 A | 6/1989 | Baker |
| 4,837,036 A | 6/1989 | Baker |
| 4,952,414 A | 8/1990 | Kaufman |
| 4,956,186 A | 9/1990 | Streiff |
| 4,968,512 A | 11/1990 | Kharrazi |
| 4,980,179 A | 12/1990 | Koenraads |
| 5,009,867 A | 4/1991 | Kratochvil |
| 5,079,024 A | 1/1992 | Crane |
| 5,098,729 A | 3/1992 | Engel |
| 5,143,742 A | 9/1992 | Maroudas |
| 5,165,945 A | 11/1992 | Yee |
| 5,180,604 A | 1/1993 | Crane |
| 5,252,352 A | 10/1993 | Banach |
| 5,356,639 A | 10/1994 | Jameson |
| 5,378,478 A | 1/1995 | Miller |
| 5,395,631 A | 3/1995 | Sweeney |
| 5,449,523 A | 9/1995 | Hansen |
| 5,470,593 A | 11/1995 | Meilinger |
| 5,520,948 A | 5/1996 | Kvamme |
| 5,580,592 A | 12/1996 | Nassauer |
| 5,656,320 A | 8/1997 | Cheng |
| 5,676,984 A | 10/1997 | Bohanan |
| 5,679,396 A | 10/1997 | Finnocchiaro |
| 5,807,601 A | 9/1998 | Carpenter |
| 5,820,903 A | 10/1998 | Fleury |
| 5,846,592 A | 12/1998 | Alderliesten |
| 5,851,577 A | 12/1998 | Brenton |
| 5,882,704 A | 3/1999 | Yamaguchi |
| 5,916,608 A | 6/1999 | Lanting |
| 6,025,008 A | 2/2000 | Akahoshi |
| 6,036,979 A | 3/2000 | Hormann |
| 6,096,352 A | 8/2000 | Kijowski |
| 6,096,870 A | 8/2000 | Mozaffar |
| 6,136,351 A | 10/2000 | Nauth |
| 6,183,802 B1 | 2/2001 | Silva |
| 6,183,805 B1 | 2/2001 | Moran |
| 6,303,160 B1 | 10/2001 | Laye |
| 6,365,205 B1 | 4/2002 | Wahlgren |
| 6,406,736 B1 | 6/2002 | Han |
| 6,416,797 B1 | 7/2002 | Han |
| 6,419,974 B1 | 7/2002 | Silva |
| 6,419,975 B1 | 7/2002 | Han |
| 6,485,762 B1 | 11/2002 | Rizvi |
| 6,544,567 B1 | 4/2003 | Davis |
| 6,558,716 B1 | 5/2003 | Kent |
| 6,572,901 B2 | 6/2003 | Han |
| 6,689,402 B1 | 2/2004 | Nauth |
| 6,740,344 B2 | 5/2004 | Murphy |
| 6,787,348 B1 | 9/2004 | Kringelum |
| 6,835,404 B2 | 12/2004 | Trecker |
| 6,861,080 B2 | 3/2005 | Kent |
| 6,893,670 B2 | 5/2005 | Smith |
| 6,982,100 B2 | 1/2006 | Swearingen |
| 7,018,664 B2 | 3/2006 | Hoier |
| 7,083,815 B2 | 8/2006 | Gutknecht |
| 7,150,894 B2 | 12/2006 | Cha |
| 7,250,183 B2 | 7/2007 | Lindstrom |
| 7,258,886 B2 | 8/2007 | Brue |
| 7,329,424 B2 | 2/2008 | Koka |
| 7,572,473 B2 | 8/2009 | Gutknecht |
| 7,579,029 B2 | 8/2009 | Wolfschoon-Pombo et al. |
| 7,582,326 B2 | 9/2009 | Brown |
| 7,585,537 B2 | 9/2009 | Merrill |
| 7,687,095 B2 | 3/2010 | Ma |
| 7,713,564 B2 | 5/2010 | Merrill |
| 7,732,184 B2 | 6/2010 | Kringelum |
| 7,763,294 B2 | 7/2010 | Gutknecht |
| 7,897,185 B1 | 3/2011 | Gutknecht |
| 7,932,078 B2 | 4/2011 | Posseme |
| 7,998,519 B2 | 8/2011 | Gutknecht |
| 8,021,883 B2 | 9/2011 | Stroman |
| 8,137,950 B2 | 3/2012 | Stuer-Lauridsen |
| 8,226,936 B2 | 7/2012 | Stroeman |
| 8,236,550 B2 | 8/2012 | Fremaux |
| 8,440,450 B2 | 5/2013 | Stroman |
| 8,449,932 B2 | 5/2013 | Bezenger |
| 8,481,027 B2 | 7/2013 | Stavnsbjerg |
| 8,501,456 B2 | 8/2013 | Yde |
| 8,597,929 B2 | 12/2013 | Kringelum |
| 8,628,763 B2 | 1/2014 | Folkenberg |
| 8,673,616 B2 | 3/2014 | Garrigues |
| 8,697,422 B2 | 4/2014 | Stahnke |
| 8,765,118 B2 | 7/2014 | Garrigues |
| 2003/0031758 A1 | 2/2003 | Koss |
| 2003/0219510 A1 | 11/2003 | Kent |
| 2004/0028801 A1 | 2/2004 | Gao |
| 2004/0146605 A1 | 7/2004 | Weibel |
| 2004/0219273 A1* | 11/2004 | Cha et al. ............... 426/580 |
| 2005/0064067 A1 | 3/2005 | Schmitt |
| 2005/0180962 A1 | 8/2005 | Raz |
| 2006/0024412 A1 | 2/2006 | Cha |
| 2006/0068075 A1 | 3/2006 | Fultz |
| 2006/0141096 A1 | 6/2006 | Gutknecht |
| 2006/0246180 A1 | 11/2006 | Galal |
| 2007/0077332 A1 | 4/2007 | Moran |
| 2008/0050467 A1 | 2/2008 | Schlothauer |
| 2008/0160133 A1* | 7/2008 | Brooks et al. ............ 426/36 |
| 2009/0041920 A1 | 2/2009 | Eibel |
| 2009/0123601 A1 | 5/2009 | Wolfschoon-Pombo et al. |
| 2009/0232937 A1 | 9/2009 | Burningham |
| 2010/0092608 A1 | 4/2010 | Gutknecht |
| 2010/0098820 A1 | 4/2010 | Imai |
| 2010/0143537 A1 | 6/2010 | Solanes |
| 2011/0117242 A1 | 5/2011 | Gutknecht |
| 2011/0268841 A1 | 11/2011 | Gutknecht |
| 2013/0344199 A1 | 12/2013 | Kibenich |
| 2015/0064152 A1 | 3/2015 | Hornbaek |
| 2015/0079057 A1 | 3/2015 | Hornbaek |
| 2015/0223480 A1 | 8/2015 | Bisgaard-Frantzen |
| 2016/0068800 A9 | 3/2016 | Hornbaek |

FOREIGN PATENT DOCUMENTS

| | | |
|---|---|---|
| EP | 2258832 A2 | 12/2010 |
| GB | 2290937 A | 1/1996 |
| IT | 1178926 B2 | 9/1987 |
| WO | 9637114 A1 | 11/1996 |
| WO | 9962348 A1 | 12/1999 |

OTHER PUBLICATIONS

Westergaard, Vagn, "Milk Powder Technology—Evaporation and Spray Drying," Niro A/S, (2004), 337 pp.; published online at www.niro.com.
"Nutrients in Milk," downloaded on Jan. 11, 2011 from www.dairyforall.com; 2 pp.
"U.S. Whey Exports," downloaded on Feb. 22, 2011 from www.fas.usda.gov; (updated May 2, 2003); 4 pp.
"Utilization of Whey," downloaded on Jan. 11, 2011 from www.dairyforall.com; 1 p.
"Whey," downloaded on Jan. 11, 2011 from www.dairyforall.com; 2 pp.
"Whey Protein Concentrates," downloaded on Jan. 11, 2011 from www.dairyforall.com; 2 pp.

(56) References Cited

OTHER PUBLICATIONS

"Reference Manual for U.S. Whey and Lactose Products," U.S. Dairy Export Council; downloaded on Feb. 23, 2011 from www.usdec.org (publication date unknown); 226 pp.

Daschner, F. et al., "Optimization of the microwave determination of water in foods using principal component analysis," Instrumentation and Measurement Technology Conference 2000 (IMTC 2000; Proceedings of the 17th IEEE), May 1-4, 2000, vol. 1 pp. 12-16; [Abstract Only, 1 p.].

"GEA Niro Method No. A 9 b, Total Fat by Gerber/Teichert", revised Sep. 2005, published on-line at www.niro.com; 2 pp.

"Protein Determination: Protein Nitrogen Content of Milk—Kjeldahl Method (Direct Method)", Jun. 1991, published on-line by the United States Department of Agriculture at www.fmmaseattle.com; 11 pp.

Davis, J.G., "Yogurt Cheese," The Milk Industry, Apr. 1971, pp. 8-11.

"Composition of Different Species of Milk," downloaded on Dec. 20, 2011 from www.dairyforall.com; 1 p.

Supplementary European Search Report: cover sheet; "Documents considered to be relevant"; and "Annex." Published on Dec. 21, 2011 in counterpart European patent application No. 06772970.7 (3 pages).

Supplementary European Search Report: cover sheet; "Documents considered to be relevant"; and "Annex." Published on May 19, 2011 in European patent application No. 05853377.9 (3 pages).

International Search Report published on Aug. 21, 2006 in PCT/US05/44435 (8 pages).

Commonly-owned U.S. Appl. No. 11/453,941, filed Jun. 15, 2006, (32 pages).

Commonly-owned U.S. Appl. No. 13/341,434, filed Dec. 30, 2011, (35 pages).

Commonly-owned U.S. Appl. No. 13/341,497, filed Dec. 30, 2011, (32 pages).

Commonly-owned U.S. Appl. No. 13/341,563, filed Dec. 30, 2011, (34 pages).

Newlander, C.E., "The Babcock Test: Notes on its Use in Determining TM Percentage of Fat in Whole Milk, Skim-Milk, Buttermilk, Cream and Whey," Bulletin No. 2, Extension Series, Mar. 1916, pp. 1-11, Publisher: Michigan Agricultural College, Extension Division.

Tamime et al., "Yoghurt Science and Technology", Pergamon Press, Oxford, p. 250, Fig. 5.12 (1985).

Roberfroid, Marcel B., et al., "The Bifidogenic Nature of Chicory Insulin and its Hydrolysis Products", Journal of Nutrition, vol. 128, No. 1, pp. 11-19 (American Society for Nutritional Sciences, Jan. 1998.

Zubillaga, M., et al., "Effect of probiotics and functional foods and their use in different diseases", Nutrition Research, vol. 21, pp. 569-579 (Elsevier Science Inc. 2001).

U.S. Food & Drug Administration, Grade "A" Pasteurized Milk Ordinance, 2001 Revision, 152pp.

Waukesha Cherry-Burrell, Votator Scraped Surface Heat Exchangers, 2001, 12pp.

Danisco, "Distilled monogycerides" (2005), 2pp.

BASF Technical Bulletin, "Beta-carotene 15M Dispersion in Corn Oil" (2004), 1p.

Cerning et al., "Isolation and Characterization of Exopolysaccharides from Slime-Forming Mesophilic Lactic Acid Bacteria,"J. Dairy Sci., vol. 75 (1992), pp. 692-699.

Kosin et al., "Microbial and Processing Criteria for Production of Probiotics: A Review," Mar. 2006, Food Technol. Biotechnol. vol. 44 No. 3, pp. 371-379.

Charteris et al., "Edible table (bio)spread containing potentially probiotic Lactobacillus and Bifidobacterium species," Int. J. Dairy Tech., Feb. 2002, vol. 55, No. 1, pp. 44-56.

Supplementary European Search Report: cover sheet; "Documents considered to be relevant"; and "Annex." Published on Aug. 7, 2009 in European patent application No. 07796426.0 (3 pages).

International Search Report published on Jun. 12, 2006 in PCT/US06/22888 (8 pages).

International Search Report published on Oct. 14, 2005 in PCT/US04/02538 (8 pages).

International Search Report published on Nov. 13, 2007 in PCT/US07/14749 (8 pages).

Commonly-owned U.S. Appl. No. 13/803,220, filed Mar. 14, 2013, (55 pages).

Kurtzweil, Paula, "Skimming the Milk Label: Fat-Reduced Milk Products Join the Food Labeling Fold," FDA Consumer, Jan.-Feb. 1998, vol. 32 Issue 1, p. 22; full text downloaded as 6 pages on Jul. 31, 2013 from: http://www.nclive.org.ezproxy.co.wake.nc.us/cgi-bin/nclsm?url=%22http://search.ebscohost.com.ezproxy.co.wake.nc.us/login.aspx?direct=true&db=a9h&AN=186486&site=ehost-live%22.

"Nutrient data for 01079, Milk, reduced fat, fluid, 2% milkfat, with added vitamin A and vitamin D," USDA National Nutrient Database for Standard Reference, downloaded on Aug. 20, 2013 from http://ndb.nal.usda.gov/ndb/foods, 2 pp.

\* cited by examiner

PROCESSES FOR MAKING CHEESE PRODUCTS UTILIZING DENATURED ACID WHEY PROTEINS

BACKGROUND OF THE INVENTION

1. Field of the Invention

The present invention relates to the field of cheese products formed by processes that include culturing lactic acid-producing bacteria in a milk composition, and methods of making the same.

2. Background of the Invention.

Cheese products that are made by processes that include culturing lactic acid-producing bacteria in a milk composition are ubiquitous in modern diets. Such cheese-making processes generally include inoculating a milk composition with lactic acid-producing bacteria, culturing the bacteria in the milk composition to form a curd and a whey, separating the curd from the whey, and recovering the curd as a cheese product. Despite the longstanding history of development of these cheese-making processes, further improvements in such processes and the resulting cheese products are still needed.

SUMMARY

In an example of an implementation, a process is provided, that includes: providing a dilute aqueous liquid acid whey protein composition containing acid whey proteins; filtering the dilute aqueous liquid acid whey protein composition, forming a concentrated aqueous liquid acid whey protein composition containing acid whey proteins; combining together the concentrated aqueous liquid acid whey protein composition and an edible caustic composition in suitable proportions to result in a substantially neutral pH; denaturing the acid whey proteins at an elevated temperature, forming a concentrated aqueous liquid denatured acid whey protein composition; providing a milk composition containing butterfat and substantial concentrations of native casein and whey proteins; combining together the milk composition and the concentrated aqueous liquid denatured acid whey protein composition, forming a dairy mix containing butterfat and a protein composition including native casein and whey proteins and denatured acid whey proteins; inoculating the dairy mix with lactic acid-producing bacteria; culturing the lactic acid-producing bacteria in the dairy mix, forming a curd and a whey; separating the curd from the whey; and recovering the curd as a cheese product. Further, for example, a cheese product made by the process is provided.

In a further example, the culturing of the lactic acid-producing bacteria in the dairy mix may include forming the whey as acid whey; and the providing of the dilute aqueous liquid acid whey protein composition may include recovering the acid whey after separating the curd from the whey, and recycling the recovered acid whey as being the dilute aqueous liquid acid whey protein composition containing acid whey proteins. As another example, the combining together of the milk composition with the concentrated aqueous liquid denatured acid whey protein composition may be at least semi-continuously carried out. In an additional example, the process may include at least semi-continuously carrying out: the providing of the dilute aqueous liquid acid whey protein composition; and the filtering of the dilute aqueous liquid acid whey protein composition to form the concentrated aqueous liquid acid whey protein composition; and the combining together of the concentrated aqueous liquid acid whey protein composition with the edible caustic composition; and the denaturing of the acid whey proteins at an elevated temperature.

Other devices, methods, features and advantages of the invention will be or will become apparent to one with skill in the art upon examination of the following figures and detailed description. It is intended that all such additional devices, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
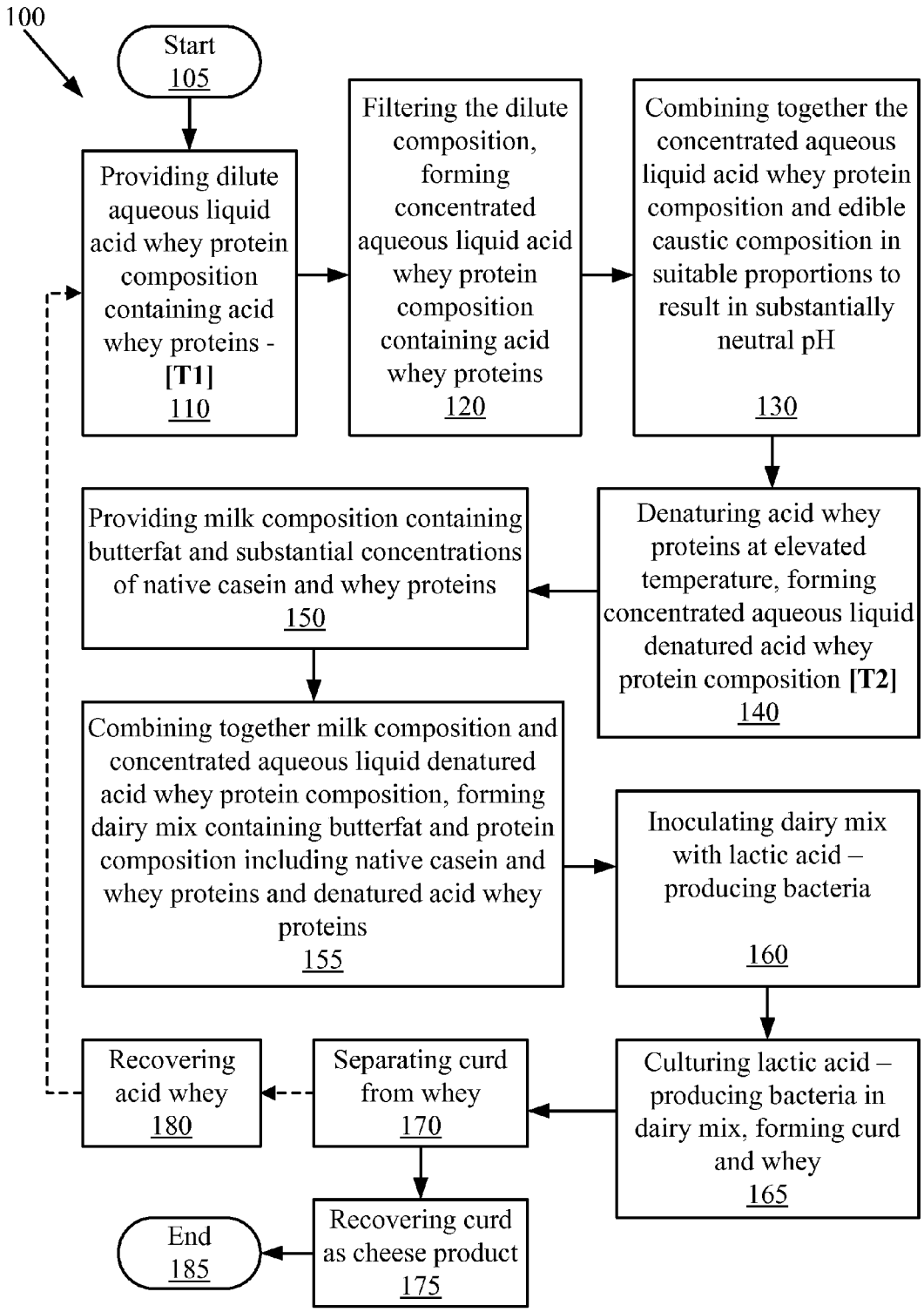
FIG. 1 is a flow chart showing an example of an implementation of a process [100] for making a cheese product.

Many types of cheese products are made by processes that include inoculating a milk composition with lactic acid-producing bacteria, culturing the bacteria in the milk composition to form a curd and a whey, separating the curd from the resulting aqueous whey composition, and recovering the curd as a cheese product. Meanwhile, a significant portion of the nutrients originating from the milk composition may remain in the resulting aqueous whey composition, for which a suitable end-use or disposal is generally needed. The whey protein contained in the resulting aqueous whey composition may be categorized, depending on its pH, as either "sweet whey protein" or "acid whey protein." Certain cheese-making processes result in the generation of aqueous whey protein compositions having a relatively low pH, which compositions accordingly are commonly referred to as "acid whey" or "sour whey". Throughout this specification, the term "acid whey protein" means the whey protein resulting from a cheese-making process that includes the culturing of lactic acid-producing bacteria in a milk composition followed by formation of a coagulated curd and separation of whey from the curd, wherein the whey as separated has a pH of about 5.1 or lower. In examples, such acid whey protein as separated from the curd may commonly have a pH within a range of between about 3.8 and about 4.6. Throughout this specification, the term "sweet whey protein" means the whey protein resulting from a cheese-making process that includes the culturing of lactic acid-producing bacteria in a milk composition followed by formation of a coagulated curd and separation of whey from the curd, wherein the whey as separated has a pH of about 5.2 or higher. In examples, such sweet whey protein as separated from the curd may commonly have a pH within a range of between about 5.2 and about 6.7.

Aqueous whey compositions containing sweet whey protein have commonly been further processed to form a variety of materials that may be further utilized as ingredients in making food products. For example, aqueous whey compositions containing sweet whey protein have been processed to simply remove all of the water to form a dry powder known as "sweet whey powder." Further, for example, aqueous whey compositions containing sweet whey protein have been processed to remove all of the water and sufficient other non-protein components to form a dry powder containing a designated minimum concentration of sweet whey protein, known as "whey protein concentrate" or "WPC." As examples, WPC-34 and WPC-80 are dry powders containing at least thirty-four percent (34%) by weight and at least eighty percent (80%) by weight, respectively, of sweet whey protein. Throughout this specification, it is understood that all weights and concentrations are measured and expressed at an ambient room temperature of about seventy degrees Fahrenheit (70° F.) and atmospheric pressure. The whey protein concentrates ("WPC") are commonly storage-stable in their dry form for about nine to twelve (9-12) months. Further, for example, aqueous whey compositions containing acid whey protein have been processed to simply remove all of the water to form a dry powder known as "acid whey powder." Acid whey powder typically is storage-stable in its dry form for about six to twelve (6-12) months. Re-hydrating any of these dry compositions to form aqueous whey protein compositions, regardless of whether they contain sweet whey protein or acid whey protein, greatly accelerates their degradation. This degradation discourages utilization of aqueous whey protein compositions as ingredients for further processing to make food products, regardless of whether they contain sweet whey protein or acid whey protein. In addition, aqueous compositions containing acid whey protein may be difficult to work with. For example, aqueous compositions that contain acid whey protein are prone to incur rapid further pH reductions simultaneously with acid-induced degradation, especially at elevated temperatures. Hence, aqueous compositions containing acid whey protein may require processing into stable ingredients for making cheese products within a relatively short period of time, before the acid-induced degradation can cause them to become rancid, spoiled, and unusable. Further, these compositions are generally hygroscopic, which complicates their handling with regard to adjusting the total water concentration in the dairy mix to produce a cheese product having an intended and acceptable water content, consistency and texture. In addition, conventional cheese-making equipment often is not designed to withstand ongoing exposure to the corrosive nature of aqueous compositions containing acid whey protein. For the foregoing reasons, aqueous acid whey protein compositions are not commonly utilized as ingredients in making cheese products. Nevertheless, cheese-making processes commonly produce a curd and a whey, where the whey is in the form of an aqueous liquid acid whey protein composition. As examples, processes for making cream cheese, Baker's cheese, ricotta cheese and cottage cheese generally result in production of an aqueous liquid acid whey protein composition. Hence, there is a need for processes by which aqueous liquid acid whey protein compositions may be utilized as ingredients in further cheese-making operations. Therefore, processes are provided herein that utilize aqueous liquid acid whey protein compositions in making cheese products.

Accordingly, a process for making a cheese product is provided, that includes: providing a dilute aqueous liquid acid whey protein composition containing acid whey proteins; filtering the dilute aqueous liquid acid whey protein composition, forming a concentrated aqueous liquid acid whey protein composition containing acid whey proteins; combining together the concentrated aqueous liquid acid whey protein composition and an edible caustic composition in suitable proportions to result in a substantially neutral pH; and denaturing the acid whey proteins at an elevated temperature, forming a concentrated aqueous liquid denatured acid whey protein composition. The process also includes providing a milk composition containing butterfat and substantial concentrations of native casein and whey proteins; and combining together the milk composition and the concentrated aqueous liquid denatured acid whey protein composition, forming a dairy mix containing butterfat and a protein composition including native casein and whey proteins and denatured acid whey proteins. The process further includes: inoculating the dairy mix with lactic acid-producing bacteria; and culturing the lactic acid-producing bacteria in the dairy mix, forming a curd and a whey. The process then includes separating the curd from the whey; and recovering the curd as a cheese product. As another example, the dilute aqueous liquid acid whey protein composition may be provided by recovering the acid whey after separating the curd from the whey.

Throughout this specification, the term "milk composition" means a liquid composition having ingredients that include butterfat and substantial concentrations of native casein protein and native whey protein, wherein the liquid composition includes one or more sources of such butterfat, native casein protein and whey protein components, examples of sources including liquid, condensed, dry or reconstituted raw-, whole-, reduced-fat- or skim-milk, or cream. Throughout this specification, the term "substantial concentrations of native casein protein and native whey protein" means such concentrations that are at least as large as those generally present in commercial reduced-fat cow milk. As an example, these sources may be derived from cow milk. Among these sources are, as examples: raw milk, cream, whole milk, reduced-fat milk, skim milk, non-fat dry milk ("NFDM"), dry cream, dry whole milk, dry reduced-fat milk, dry skim milk, condensed cream, condensed whole milk, condensed reduced-fat milk, condensed skim milk, and reconstituted milk. Throughout this specification, the term "dilute aqueous liquid acid whey protein composition" means an aqueous composition containing less than about three percent (3%) by weight of acid whey protein. Throughout this specification, the term "concentrated aqueous liquid acid whey protein composition" means an aqueous composition containing at least about three percent (3%) by weight of acid whey protein. Throughout this specification, the term "concentrated aqueous liquid denatured acid whey protein composition" means a concentrated aqueous liquid acid whey protein composition wherein the acid whey proteins have been substantially aggregated into solids. Throughout this specification, the term "substantially aggregated" means that at least about five percent (5%) by weight of the acid whey proteins have been aggregated into solids. Throughout this specification, the term "dairy mix" means a composition including a milk composition combined together with a concentrated aqueous liquid denatured acid whey protein composition. Throughout this specification, the term "cheese product" means a cheese curd resulting from the culturing of lactic acid-producing mesophilic, thermophilic, or mesophilic and thermophilic bacteria in a dairy mix. Throughout this specification, the term "Cream Cheese" means a cheese product in compliance with the Standard of Identity for Cream Cheese as codified by the United States Food & Drug Administration at Title 21 Code of Federal Regulations Section 133.133. Throughout this specification, the terms "Yogurt", "Lowfat Yogurt" and "Nonfat Yogurt" respectively mean dairy products in compliance with the Standards of Identity for Yogurt, Lowfat Yogurt and Nonfat Yogurt, produced by culturing strains of both *Lactobacil-*

*lus—delbrueckii—bulgaricus* and *Streptococcus—salivarius—thermophilus* in a milk composition, as codified by the United States Food & Drug Administration at Title 21 Code of Federal Regulations Sections 131.200, 131.203, and 131.206.

Figure 2:
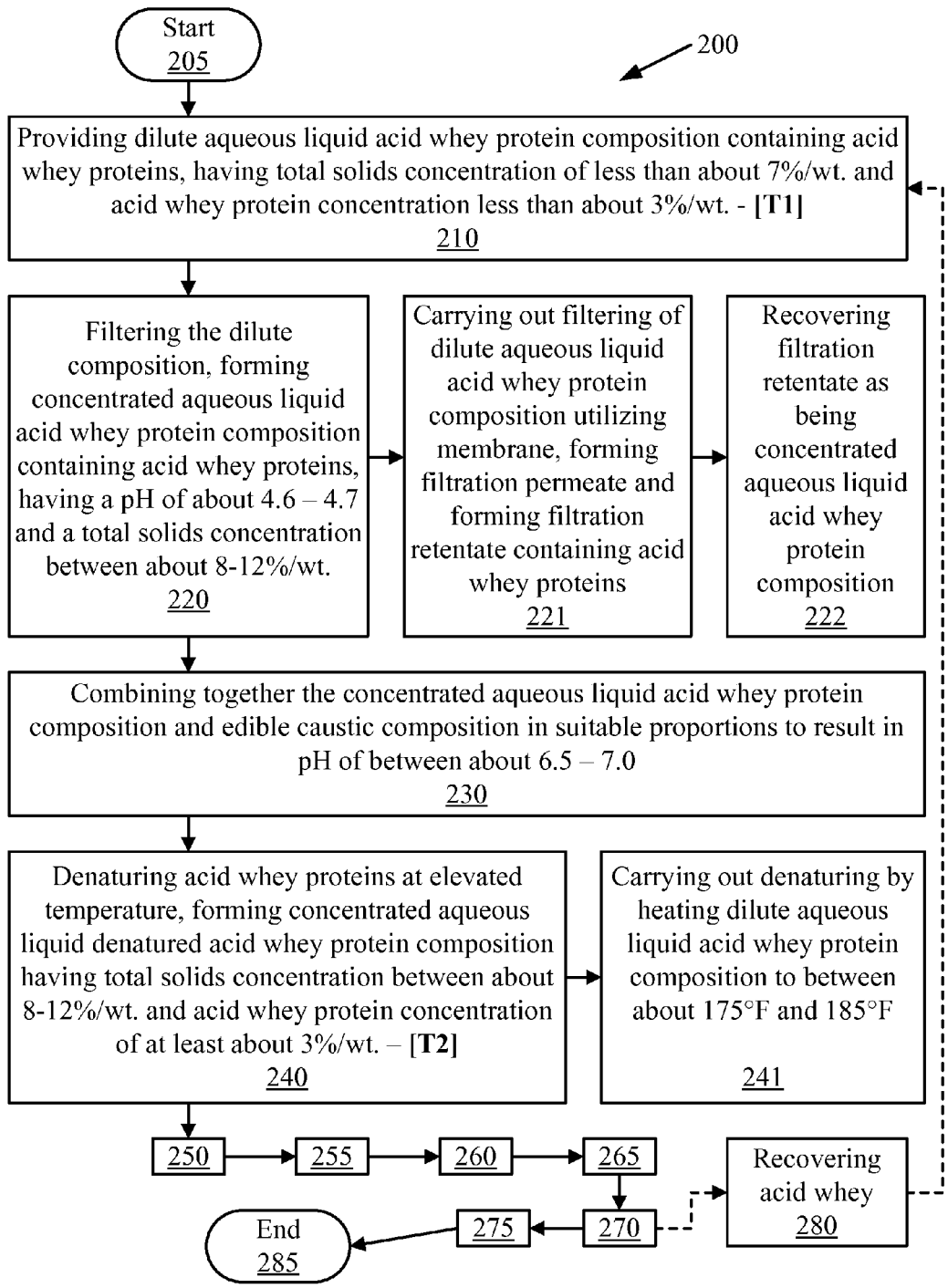
FIG. 2 is a flow chart showing another example [200] of the process [100] illustrated in FIG. 1.
Figure 3:
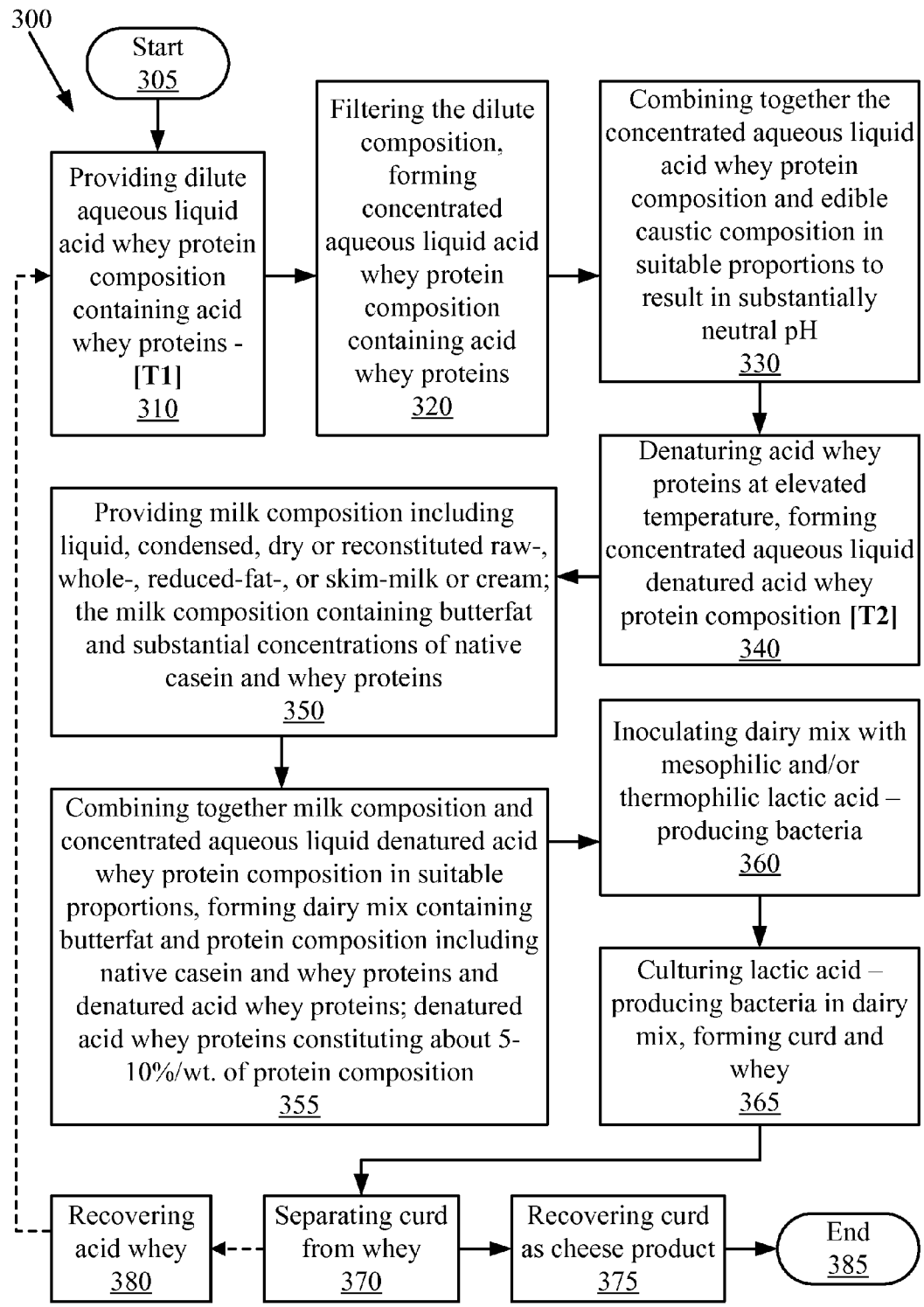
FIG. 3 is a flow chart showing a further example [300] of the process [100] illustrated in FIG. 1.

FIG. 1 is a flow chart showing an example of an implementation of a process [100] for making a cheese product. The entireties of the discussions below of the processes [200, 300] in connection with FIGS. 2-3 are deemed to be incorporated into this discussion of the process [100] in connection with FIG. 1.

The process [100] starts at step [105]. At step [110], a dilute aqueous liquid acid whey protein composition containing acid whey proteins is provided. Then at step [120], the dilute aqueous liquid acid whey protein composition is filtered, thereby forming a concentrated aqueous liquid acid whey protein composition containing acid whey proteins.

At step [130] of the process [100], the concentrated aqueous liquid acid whey protein composition and an edible caustic composition are combined together in suitable proportions to result in a substantially neutral pH. Throughout this specification, the term "substantially neutral pH" means a pH within a range of between about 6.5 and about 7.5. Examples of edible caustic compositions that may be utilized include sodium hydroxide, ammonium hydroxide, ammonia, calcium carbonate, calcium hydroxide, calcium sulfate, magnesium hydroxide, potassium carbonate, potassium hydroxide, sodium bicarbonate, and sodium carbonate. Step [130] is carried out to adjust the pH of the concentrated aqueous liquid acid whey protein composition in this manner prior to carrying out denaturing of the acid whey proteins at an elevated temperature in step [140] as next discussed. Heating the concentrated aqueous liquid acid whey protein composition to an elevated temperature in connection with the denaturing at step [140] without having adjusted the pH to be substantially neutral may produce denatured acid whey proteins that will not coagulate in the curd at step [165] further discussed below and may not be retained in the curd at step [170]. Heating the concentrated aqueous liquid acid whey protein composition to an elevated temperature in connection with the denaturing at step [140] without having so adjusted the pH may also cause an unacceptable level of acid-induced degradation of the concentrated aqueous liquid acid whey protein composition. As an example, one (1) pound of sodium hydroxide may be combined with each one thousand (1,000) pounds of the concentrated aqueous liquid acid whey protein composition in carrying out step [130].

Step [140] of the process [100] includes heating the concentrated aqueous liquid acid whey protein composition to an elevated temperature to denature the acid whey proteins, forming a concentrated aqueous liquid denatured acid whey protein composition. As an example, the concentrated aqueous liquid denatured acid whey protein composition may contain a concentration of total solids within a range of between about eight percent (8%) by weight and about twelve percent (12%) by weight. Further, for example, a concentrated aqueous liquid denatured acid whey protein composition containing such a concentration of solids may contain a corresponding concentration of denatured acid whey protein solids of at least about three percent (3%) by weight, or within a range of between about three percent (3%) by weight and about five percent (5%) by weight, or within a range of between about three percent (3%) by weight and about four percent (4%) by weight. In addition, for example, about thirty-four percent (34%) by weight of the total solids in such a concentrated aqueous liquid denatured acid whey protein composition may be constituted by denatured acid whey protein. In addition to water and the denatured acid whey protein solids, the concentrated aqueous liquid denatured acid whey protein composition may also include, for example, one or more other liquid or solid components.

At step [150] of the process [100], a milk composition is provided, being a liquid composition having ingredients that include butterfat and substantial concentrations of native casein protein and native whey protein, wherein the liquid composition includes one or more sources of such butterfat, native casein protein and whey protein components, examples of sources including liquid, condensed, dry or reconstituted raw-, whole-, reduced-fat- or skim-milk, or cream. As an example, these sources may be derived from cow milk. Among these sources are, as examples: raw milk, cream, whole milk, reduced-fat milk, skim milk, non-fat dry milk ("NFDM"), dry cream, dry whole milk, dry reduced-fat milk, dry skim milk, condensed cream, condensed whole milk, condensed reduced-fat milk, condensed skim milk, and reconstituted milk. For example, the milk composition may include a mixture of whole milk, condensed skim milk, and NFDM. In an example, the milk composition may be maintained at a cool temperature, such as about forty degrees Fahrenheit (40° F.).

As another example, step [150] may include combining an edible oil with the milk composition. As examples, such an edible oil may be of vegetable or animal origin or of both vegetable and animal origin. Examples of vegetable oils that may be utilized include edible oils derived from seeds or fruit of soy, corn, canola, sunflower, safflower, olive, peanut, cottonseed, sesame, almond, apricot, avocado, coconut, flax, grapeseed, hazelnut, palm, pine, poppy, pumpkin, rice bran, tea, walnut, or wheat. Examples of animal oils that may be utilized include lard, shortening, suet, and tallow.

Step [155] of the process [100] includes combining together the milk composition with the concentrated aqueous liquid denatured acid whey protein composition formed at step [140], forming a dairy mix containing butterfat and a protein composition including native casein and whey proteins and denatured acid whey proteins. The concentrated aqueous liquid denatured acid whey protein composition that is formed at step [140] is combined together with the milk composition at step [155] without converting the concentrated aqueous liquid denatured acid whey protein composition to a dry form.

In an example, step [155] may include standardizing the composition of the dairy mix. This standardization may be carried out, for example, by adjusting the relative proportions of the concentrated aqueous liquid denatured acid whey protein composition and of the sources of butterfat, native casein and whey proteins, and denatured acid whey protein that are utilized in forming the dairy mix. Water may also be added. For example, the dairy mix may be standardized to contain a concentration of butterfat within a range of between about eleven and one-half percent (11.5%) by weight and about thirteen percent (13%) by weight, or a concentration of about twelve percent (12%) by weight of butterfat. As a further example, the dairy mix may be standardized to contain a concentration of total solids within a range of about eighteen and one-half percent (18.5%) by weight and about twenty percent (20%) by weight; or a concentration of about nineteen percent (19%) total solids. The dairy mix may also, for example, be standardized to contain a ratio of total butterfat to total protein, including the combined native casein and whey proteins and the denatured acid whey proteins, within a range of about twenty-one percent (21%) by weight and about twenty-two percent (22%) by weight. In an additional example, the dairy mix may have a water content adjusted to be within a range of between about 50% by weight and about 60% by weight; or within a range of between about 50% by weight and about 55% by weight. In general, the texture and mouth feel of cheese products may improve with higher butterfat content. Higher butterfat levels may also provide better tolerance of the dairy mix to subsequent processing steps, such as agitation shear that can degrade butterfat and protein molecules.

Step [155] may include, as another example, mixing together the milk composition and the concentrated aqueous liquid denatured acid whey protein composition. The mixing may, for example, further include homogenizing the dairy mix by subjecting it simultaneously to an elevated pressure and temperature. In an example, the dairy mix may be homogenized for about two (2) seconds by a two-stage procedure including an initial second-stage homogenization under a pressure of at least about five hundred (500) pounds per square inch ("PSI"), followed by a first-stage homogenization under a pressure within a range of between about one thousand (1,000) PSI and about five thousand (5,000) PSI, or a pressure of about two thousand (2,000) PSI. As the selected pressure to be applied to the dairy mix is increased, the resulting viscosity of the dairy mix and of the final cheese product may also accordingly increase. Homogenization may, for example, be facilitated by heating the dairy mix, such as to a temperature of about one hundred and thirty (130) degrees Fahrenheit (° F.). The elevated pressure may be generated by hydraulic or mechanical force, as examples. In one example, homogenization may include confining the dairy mix at a selected pressure in a closed pressurized chamber and then allowing the dairy mix to escape from the chamber through an orifice to quickly release the pressure. For example, a Gaulin homogenizer may be utilized. In general, carrying out the homogenization at an elevated temperature may increase the fluidity of the dairy mix, thereby improving the flow of the dairy mix out from the pressurized chamber.

In an example, homogenizing the dairy mix at step [155] may be carried out utilizing a homogenizer apparatus having an inlet chamber, a homogenization chamber, and an outlet chamber. In this example, the inlet chamber may be a vessel suitable for staging a supply of the dairy mix, on a continuous or batch basis, for introduction into the homogenization chamber. The homogenization chamber in this example may be a vessel having controllable orifices for input and output of the dairy mix, and may be reinforced to withstand containment of an elevated pressure suitable for homogenization. Further in this example, the outlet chamber may be a vessel suitable for staging a supply of the homogenized dairy mix, on a continuous or batch basis, for further processing. In operation of this example of a homogenizer apparatus, the dairy mix may pass through the inlet chamber before being pumped into the homogenization chamber. Following homogenization, the dairy mix may be expelled from the homogenization chamber into the outlet chamber. For example, these flows may be carried out on a continuous basis, although a batch process may also be done. A pressure within the homogenization chamber may, for example, be adjusted to a selected homogenization pressure and so maintained during homogenization. In an example, the homogenization chamber may be configured for subjecting the dairy mix to the two-stage homogenization discussed earlier, including an initial second-stage homogenization under a pressure of at least about five hundred (500) PSI followed by a first-stage homogenization under a pressure within a range of between about one thousand (1,000) PSI and about five thousand (5,000) PSI, or a pressure of about two thousand (2,000) PSI. The pressure in the inlet chamber may be, for example, within a range of between about twenty (20) PSI and about forty (40) PSI, generated by pumping of the dairy mix into the inlet chamber. Similarly, the pressure in the outlet chamber may be, for example, within a range of between about twenty (20) PSI and about forty (40) PSI, generated by expelling the dairy mix from the homogenization chamber and then containing it in the outlet chamber. The dairy mix may undergo a pressure drop upon passing from the homogenization chamber to the outlet chamber, by ejection through an orifice, such as for example an orifice having a diameter of about a centimeter. The pressures within the inlet chamber, outlet chamber and homogenization chamber may be carefully controlled, as an example, to avoid entrainment of air into the homogenization chamber. Air entrainment into the homogenization chamber may cause cavitation, which may degrade the dairy mix and may potentially lead to an explosive release of the homogenization pressure.

In another example, step [155] of the process [100] may include pasteurizing the dairy mix. The dairy mix is generally in a pasteurized condition when the dairy mix is inoculated at step [160] with lactic acid-producing bacteria, so that the culturing at step [165] does not facilitate spoilage of the dairy mix by unintended growth of the wild bacteria and other microbes normally present in unpasteurized milk compositions. Effective pasteurization is a function of both time and temperature; pasteurization may be completed at higher temperatures in correspondingly shorter times. As examples, pasteurization of the dairy mix may be carried out by a vat process at a temperature within a range of between about one hundred and fifty degrees Fahrenheit (150° F.) and about one hundred and seventy degrees Fahrenheit (170° F.) for about thirty (30) minutes; or at a temperature of about one hundred and sixty-five degrees Fahrenheit (165° F.) for about fifteen (15) minutes. High temperature short time pasteurization, in which the dairy mix is pumped through an in-line tube within a temperature-controlled shell, may also be utilized. For example, high temperature/short time pasteurization may be carried out at a temperature of about one hundred and seventy degrees Fahrenheit (170° F.) for a time period of about seventeen (17) seconds. The pasteurization may, for example, be carried out with agitation of the dairy mix to facilitate even heating throughout the dairy mix. In general, moderate agitation is utilized to avoid excessive shear which may degrade the dairy mix. The force applied by the agitation should not be so strong as to substantially shear and thus degrade the butterfat and proteins in the dairy mix. In examples, the pasteurization may be carried out in a tank equipped with a heater and agitator, such as a Groen kettle.

At step [160] of the process [100], the dairy mix is inoculated with live and active lactic acid-producing bacteria. In an example, step [160] may include inoculating the dairy mix with at least one strain of lactic acid-producing mesophilic bacteria suitable for being cultured in the dairy mix at step [165], forming a cheese. For example, a strain of lactic acid-producing mesophilic bacteria may be selected that is known to produce diacetyl (also known as 2,3-butanedione), which contributes a "buttery" flavor to the cheese product. The resulting cheese product may be, as an example, a cream cheese product. Examples of diacetyl-producing strains of lactic acid-producing mesophilic bacteria include *Lactococcus—lactis—lactis—diacetylactis*, and *Leuconostoc mesenteroides cremoris*. Additional examples of strains of lactic acid-producing mesophilic bacteria include *Lactococcus—lactis—lactis, Lactococcus—lactis—cremoris*, and *Lactobacillus helveticus*. The cheese product resulting from culturing either or both *Lactococcus—lactis—lactis* and *Lactococcus—lactis—cremoris* mesophilic bacteria in the dairy mix may be, as examples, a cream cheese or a yogurt. Suitable lactic acid-producing mesophilic bacteria strains may be commercially available under the trade name pHage Control™ from Chr. Hansen, Bøge Allé 10-12, DK-2970 Hørsholm, Denmark; and may include grades 604 and 608. Further suitable lactic acid-producing mesophilic bacteria strains may be commercially available under the trade names Flay Direct™ and DG™ Cultures, from Degussa BioActives, 620 Progress Avenue, P.O. Box 1609, Waukesha, Wis. 53187-1609. As another example, step [160] may include inoculating the dairy mix with, either in addition to or instead of the mesophilic bacteria, at least one strain of lactic acid-producing thermophilic bacteria suitable for culturing in the dairy mix at step [165], forming a cheese product. Examples of strains of lactic acid-producing thermophilic bacteria include: *Lactobacillus—delbrueckii—bulgaricus, Streptococcus—salivarius—thermophilus, Lactobacillus—acidophilus, Bifidobacterium—longum, Bifidobacterium—infantis, Lactobacillus—casei—casei*, and *Lactobacillus—paracasei—casei*. For example, where strains of *Lactobacillus—delbrueckii—bulgaricus* and *Streptococcus—salivarius—thermophilus* are both utilized, then the resulting cheese product may be Yogurt. Suitable strains of lactic acid-producing thermophilic bacteria may be commercially available, for example, under the trade name Yo-Fast® from Chr. Hansen, Bøge Allé 10-12, DK-2970 Hørsholm, Denmark; and under the trade names Ultra-Gro® and Sbifidus® from Degussa BioActives, 620 Progress Avenue, P.O. Box 1609, Waukesha, Wis. 53187-1609.

The inoculating of the dairy mix with live and active lactic acid-producing bacteria at step [160] of the process [100] may include, either before or after the inoculating, adjusting the dairy mix to a temperature suitable for facilitating the culturing of the lactic acid-producing bacteria in the dairy mix at step [165]. As examples, the dairy mix may be adjusted to a temperature suitable for culturing of mesophilic bacteria, within a range of between about sixty-five degrees Fahrenheit (65° F.) and about ninety-two degrees Fahrenheit (92° F.); or to a temperature within a range of between about seventy degrees Fahrenheit (70° F.) and about eighty-five degrees Fahrenheit (85° F.); or to a temperature within a range of between about eighty-two degrees Fahrenheit (82° F.) and about eighty-four degrees Fahrenheit (84° F.); or to a temperature of about eighty-two degrees Fahrenheit (82° F.). Further, for example, the dairy mix may be adjusted to a temperature suitable for culturing of thermophilic bacteria, within a range of between about ninety-five degrees Fahrenheit (95° F.) and about one hundred and twelve degrees Fahrenheit (112° F.); or to a temperature within a range of between about one hundred degrees Fahrenheit (100° F.) and about one hundred and ten degrees Fahrenheit (110° F.); or to a temperature within a range of between about one hundred and six degrees Fahrenheit (106° F.) and about one hundred and ten degrees Fahrenheit (110° F.); or to a temperature of about one hundred and eight degrees Fahrenheit (108° F.).

The dairy mix generally may be inoculated with a suitable amount of a composition containing the selected live and active lactic acid-producing bacteria at step [160]. As examples, the composition containing the selected live and active lactic acid-producing bacteria may be a concentrated solution of the bacteria in a growth medium; or may be a portion of the dairy mix collected after the culturing is carried out at step [165], constituting a "mother culture". The inoculating of the dairy mix with live and active lactic acid-producing bacteria at step [160] of the process [100] may further include agitating the dairy mix after combining together the dairy mix and the lactic acid-producing bacteria. In an example, a moderate shear force may be utilized, so as to efficiently disperse the lactic acid-producing bacteria in the dairy mix within a reasonable time, while avoiding excessive shear which may degrade the dairy mix or the lactic acid-producing bacteria. For example, the dairy mix may be subjected to moderate agitation for a time period within a range of between about ten (10) minutes and about twenty-five (25) minutes; or of about fifteen (15) minutes.

In step [165] of the process [100], the lactic acid-producing bacteria are cultured in the dairy mix, forming a curd and a whey. The duration of this bacteria culturing step depends on a plurality of factors, including the strain of bacteria utilized, the level of activity of the bacteria, the selected culture temperature, the initial bacteria concentration, and the composition of the dairy mix. The bacteria digest the lactose sugars in the dairy mix and produce lactic acid. Relatively high culture temperatures and relatively high initial bacteria concentrations generally shorten the culture time needed. The culture temperature employed, however, is generally within a range tolerable to the survival and growth of the selected culture bacteria. Thermophilic bacteria generally remain live and active within relatively higher temperature ranges than are generally suitable for survival and growth of live and active mesophilic bacteria. In one example, step [165] may include holding the dairy mix at a suitable temperature for cultures of the selected lactic acid-producing bacteria to grow for a sufficient time so that there is visible curd formation throughout the dairy mix, resulting in its substantial thickening. Where step [165] includes inoculating the dairy mix with live and active mesophilic bacteria, then step [165] may include holding the dairy mix at a temperature within a range of between about sixty-five degrees Fahrenheit (65° F.) and about ninety-two degrees Fahrenheit (92° F.); or at a temperature within a range of between about seventy degrees Fahrenheit (70° F.) and about eighty-five degrees Fahrenheit (85° F.); or at a temperature within a range of between about eighty-two degrees Fahrenheit (82° F.) and about eighty-four degrees Fahrenheit (84° F.); or at a temperature of about eighty-two degrees Fahrenheit (82° F.). As further examples, the selected live and active mesophilic bacteria may be cultured in the dairy mix for a time period within a range of between about ten (10) hours and about sixteen (16) hours; or for a time period within a range of between about ten (10) hours and about twelve (12) hours. Where step [160] includes inoculating the dairy mix with live and active thermophilic bacteria, then step [165] may include holding the dairy mix at a temperature within a range of between about ninety-five degrees Fahrenheit (95° F.) and about one hundred and twelve degrees Fahrenheit (112° F.); or within a range of between about one hundred degrees Fahrenheit (100° F.) and about one hundred and ten degrees Fahrenheit (110° F.); or within a range of between about one hundred and six degrees Fahrenheit (106° F.) and about one hundred and ten degrees Fahrenheit (110° F.); or at a temperature of about one hundred and eight degrees Fahrenheit (108° F.). As further examples, the selected live and active thermophilic bacteria may be cultured in the dairy mix for a time period within a range of between about four (4) hours and about eight (8) hours; or for about six (6) hours.

Lactic acid is formed as a byproduct of metabolism of lactose sugars by the bacteria in step [165]. Hence, the measured pH of the dairy mix, which gradually decreases with lactic acid buildup, is an indication of the progress of the bacteria culture. Prior to inoculating the dairy mix at step [160] with the lactic acid-producing bacteria, the pH of the dairy mix may be, for example, within a range of between about 6.8 and about 6.2. In an example, culturing of the bacteria in step [165] may be continued until the pH of the dairy mix has been reduced by a buildup of lactic acid to be within a range of between about 5.0 and about 4.1. In general, the level of activity of the lactic acid-producing bacteria may markedly decrease as the pH of the dairy mix is reduced to less than about 4.4. Accordingly, as another example, culturing of the bacteria in step [165] may be continued until the pH of the dairy mix has been reduced to be within a range of between about 5.0 and about 4.4; or to be within a range of between about 4.80 and about 4.50; or to be within a range of between about 4.75 and about 4.70. As the pH of the dairy mix approaches a selected final pH of the culturing of the bacteria in step [165], the viscosity of the dairy mix may significantly increase while the level of activity of the lactic acid-producing bacteria may significantly decrease. Hence, in an example, the pH of the dairy mix may be monitored during the culturing of the bacteria in step [165], and the inoculating of the dairy mix with the lactic acid-producing bacteria at step [160] may be repeated to reinvigorate the culturing of the bacteria in the dairy mix. As a further example, the pH of the dairy mix for a flavored cheese product, meaning one that contains fruits, vegetables, nuts, flavorings, condiments or other food additives, may likewise be within a range of between about 4.8 and about 4.5, with some potential variations depending on the pH and nature of the additives. At a pH of the dairy mix above about 4.80, the resulting cheese product viscosity may become excessively low, potentially resulting in poor body or runniness.

The culturing of the lactic acid-producing bacteria in the dairy mix at step [165] is generally completed within a reasonable period of time, to avoid exposing the dairy mix to the bacteria culturing temperatures as discussed above for any longer than necessary. Completing the culturing of the lactic acid-producing bacteria in the dairy mix at step [165] within a reasonable time may be important, for example, in order to minimize degradation of the dairy mix that may otherwise be caused by the unintended growth of other bacteria which may lead to spoilage of the dairy mix. Accordingly, the completion of step [165] of the process [100] may be accelerated by directly acidifying the dairy mix to supplement the pH—reducing buildup of lactic acid produced by the culture bacteria. Direct acidification may, for example, facilitate timely completion of step [165] where the lactic acid-producing activity of the culture bacteria is insufficient to reduce the pH of the dairy mix to a selected endpoint within a suitable maximum time period. As an example, the direct acidification may be carried out by combining an appropriate amount of an edible acid with the dairy mix. Examples of suitable edible acids include lactic acid, phosphoric acid, acetic acid, and citric acid. For example, vinegar, an aqueous solution of acetic acid, may be utilized. In an example, an aqueous mixture of edible acids that may be utilized, having a pH within a range of between about 0.08 and about 1.4, may be commercially available under the trade name Stabilac® 12 Natural from the Sensient Technologies Corporation, 777 East Wisconsin Avenue, Milwaukee, Wis. 53202-5304. As another example, similar edible acid mixtures may also be commercially available from Degussa Corporation, 379 Interpace Parkway, P.O. Box 677, Parsippany, N.J. 07054-0677. Direct acidification may not be feasible in some cases.

Direct acidification, if included in step [165], may be carried out, for example, in a set tank internally equipped with a scraped surface agitator to ensure rapid and thorough mixing together of the edible acid and the dairy mix. Agitation may, as an example, be discontinued upon reaching a selected final pH for the dairy mix, to avoid excessively shearing and possibly breaking down the viscosity of the resulting cheese product. The direct acidification may generally be carried out at the temperature selected for culturing the lactic acid-producing bacteria in the dairy mix at step [165], for example. In another example, the direct acidification may be carried out at a relatively reduced temperature, such as a temperature within a range of between about seventy-five degrees Fahrenheit (75° F.) and about sixty degrees Fahrenheit (60° F.). However, the viscosity of the dairy mix may generally increase as the temperature is reduced, which may impede mixing together of the edible acid and the dairy mix. Accordingly, carrying out the direct acidification at a temperature below about sixty degrees Fahrenheit (60° F.) may cause the resulting cheese product to have a lumpy texture. Cooling can be effected, for example, using jacketed tanks containing a glycol refrigerant maintained at a selected temperature to withdraw heat from the dairy mix in the tank.

At step [170] of the process [100], the curd is separated from the whey. The reduction of the pH of the dairy mix that takes place during step [165] causes the formation of two phases in the dairy mix, including a solid-form curd, and a liquid whey. In an example, the curd and whey phases of the dairy mix may be separated by passing the dairy mix through a suitable mechanical separator apparatus. For example, a centrifugal separator apparatus may be utilized. Examples of suitable centrifugal separator apparatus for separating the cheese curd from the whey are disclosed in: Link U.S. Pat. No. 2,387,276 "Cream Cheese Manufacture," issued on Oct. 23, 1945; and Strezynski U.S. Pat. No. 2,436,498 "Apparatus for Use in the Centrifugal Separation of Serum from Cheese Constituents," issued on Feb. 24, 1948. The entireties of each of these two U.S. patents are hereby incorporated herein by reference. Suitable centrifugal separator apparatus may also be commercially available under the trade name "Westfalia Separator," from GEA Westfalia Separator, Werner-Habig Strasse 1, Oelde 59302 Germany, website www.westfalia-sesarator.com. As an example, a mechanical separator apparatus may be selected having adequate throughput capacity so that the separation of the curd from the whey at step [170] does not cause rate-limiting delays in the process [100]. Such delays may cause, for example, corresponding delays in completion of acidification of the dairy mix to a selected final pH at step [165]. In operating a mechanical separator apparatus to carry out step [170] of the process [100], the mechanical separator apparatus may be configured to control the moisture level in the cheese curd. For example, a backpressure valve in a centrifugal separator apparatus may be adjusted to provide such moisture level control. In an example, step [170] may include heating the dairy mix to an elevated temperature in a degassing vessel to "break" the curd from the whey before passing the dairy mix through a mechanical separator apparatus. For example, the dairy mix may be heated to an elevated temperature within a range of between about one hundred and sixty degrees Fahrenheit (160° F.) and about one hundred and seventy-five degrees Fahrenheit (175° F.), or to a temperature of about one hundred and seventy degrees Fahrenheit (170° F.). In another example, step [170] may include directing the whey into a holding tank. Further, for example, the whey may be passed through a plate heat exchanger to balance its temperature at a selected temperature within a range of between about seventy degrees Fahrenheit (70° F.) and about ninety degrees Fahrenheit (90° F.).

Step [175] of the process [100] includes recovering the curd as a cheese product. The cheese product contains butterfat, native casein and whey proteins, and denatured acid whey proteins. As examples, the cheese product may be a cream cheese, a cream cheese product, or a yogurt. Further, for example, the cheese product may be a cream cheese in compliance with the Standard of Identity for Cream Cheese as codified by the United States Food & Drug Administration at Title 21 Code of Federal Regulations Section 133.133. As further examples, the cheese product recovered at step [175] may be a Neufchatel cheese, a Lowfat Cream Cheese, Baker's cheese, or ricotta cheese. The process [100] may then end at step [185].

As another example, the culturing of the lactic acid-producing bacteria in the dairy mix at step [165] may include forming the whey as acid whey; and providing the dilute aqueous liquid acid whey protein composition at step [110] may include carrying out step [180], wherein: the acid whey is recovered, for example from the holding tank, after separating the curd from the whey at step [170]; and the recovered acid whey is then recycled at step [110] as being the dilute aqueous liquid acid whey protein composition containing acid whey proteins. In another example, the combining together of the milk composition and the concentrated aqueous liquid denatured acid whey protein composition at step [155] may be at least semi-continuously carried out. Further in that example, the forming of the concentrated aqueous liquid denatured acid whey protein composition at step [140] may also include at least semi-continuously: at step [110] providing the dilute aqueous liquid acid whey protein composition, at step [120] filtering the dilute aqueous liquid acid whey protein composition to form the concentrated aqueous liquid acid whey protein composition, at step [130] combining together the concentrated aqueous liquid acid whey protein composition and the edible caustic composition, and at step [140] denaturing the acid whey proteins at an elevated temperature.

In an example, the process [100] may include controlling the time period over which the dilute aqueous liquid acid whey protein composition provided at step [110] is denatured at step [140]. For example, a point in time when the dilute aqueous liquid acid whey protein composition is provided at step [110] may be designated as "T1". Further, for example, another point in time at which denaturing of acid whey proteins has been completed to form the concentrated aqueous liquid denatured acid whey protein composition at step [140] may be designated as "T2". As an example, a time period between T1 and T2 may be controlled to be within about thirty (30) minutes and about five (5) hours. Controlling the time period between T1 and T2 in the process [100] may, as an example, serve to stabilize the acid whey protein compositions before their acid-induced degradation can cause them to become rancid, spoiled and unusable. In an example where the process [100] includes recovering the acid whey at step [180], T1 may be defined as the point in time when the acid whey is separated from the curd at step [170].

In a further example, step [175] of the process [100] may include combining the curd together with a salt and a stabilizer. The curd, salt, and stabilizer may, as an example, be combined together at an elevated temperature, such as about one hundred and sixty-five degrees Fahrenheit (165° F.). Examples of types of stabilizers that may be utilized include gums, salts, and emulsifiers. Suitable gums include, for example, locust bean gum, xanthan gum, guar gum, gum arabic, and carageenan. Suitable salts include, for example, sodium chloride and potassium chloride. Such salts may, for example, be combined with the curd without adding any of the other stabilizers identified herein. Suitable emulsifiers include, for example, sodium citrate, potassium citrate, mono-, di-, and tri-sodium phosphate, sodium aluminum phosphate, sodium tripolyphosphate, sodium hexametaphosphate, dipotassium phosphate, and sodium acid pyrophosphate. As an example, the stabilizer may include K6B493, a milled, dry product that may be commercially available from CP Kelco US, Inc., 1313 North Market Street, Wilmington, Del. 19894-0001. In another example, the stabilizer may include gum Arabic, or may include a blend of xanthan gum, locust bean gum and guar gum. Suitable gum compositions may be commercially available from TIC Gums Inc., Belcamp, Md. For example, a stabilizer may be combined with the cheese product in an amount constituting between about 0.25% by weight and about 0.45% by weight of the cheese product; or in an amount constituting between about 0.3% by weight and about 0.4% by weight of the cheese product. As another example, step [175] of the process [100] may include mixing together the curd, salt and stabilizer. The mixing may, for example, further include homogenizing the curd, salt and stabilizer by subjecting the mixture simultaneously to an elevated pressure and temperature. As examples, the homogenization procedures and conditions discussed earlier in connection with step [155] of the process [100] may be utilized. Step [175] of the process [100] may further include packaging the cheese product while still at an elevated temperature, and then reducing the temperature of the cheese product to a suitable refrigeration temperature, such as, for example, a temperature within a range of between about thirty-four degrees Fahrenheit (34° F.) and about thirty-eight degrees Fahrenheit (38° F.). In another example, step [175] of the process [100] may alternatively include reducing the temperature of the cheese product to a suitable refrigeration temperature prior to packaging the cheese product.

In a further example, step [175] of the process [100] may include adding a suitable preservative to the cheese product to retard growth of bacteria, yeast and mold. For example, potassium sorbate, sodium benzoate, sorbic acid, ascorbic acid or nisin may be added. Nisin, for example, is a protein expressed by *Lactococcus lactis*. Further, for example, flavorings, condiments and the like may be added to the cheese product.

As another example, step [175] may include combining live and active probiotic lactic acid-producing thermophilic bacteria with the cheese product. For example, the cheese product may be combined together with a strain of lactic acid-producing thermophilic bacteria including, as examples, *Lactobacillus—delbrueckii—bulgaricus, Streptococcus—salivarius—thermophilus, Lactobacillus—acidophilus, Bifidobacterium—longum, Bifidobacterium—infantis, Lactobacillus—casei—casei*, and *Lactobacillus—paracasei—casei*. These strains of bacteria are retained in the digestive tract where they aid in food digestion. They are accordingly referred to as "probiotic", which means that the subject bacteria, in live and active form, are beneficial to the consumer when ingested.

Step [175] may include, as an additional example, combining together the cheese product with a non-digestible oligosaccharide or polysaccharide, or with an oligosaccharide or polysaccharide that is resistant to metabolism. Examples of such oligosaccharides include inulin, lactulose, and lactitol. Inulin has a mildly sweet taste and is filling like starchy foods, but is not normally absorbed in human metabolism and therefore does not affect the sugar cycle. Inulin reduces the body's need to produce insulin, helping to restore normal insulin levels. Inulin also is a prebiotic that extends the viability of the live and active probiotic bacteria in the digestive tract of the consumer, so that their beneficial effects in the body are increased. Inulin may, however, be implicated in food allergies, and may potentially induce anaphylactic shock in some people.

In further examples, the cheese product may be subjected to a whipping process to modify the cheese product to have a whipped, more easily spreadable consistency. Information as to suitable procedures for carrying out such whipping processes, and further background information regarding processes for making cheese products, is disclosed in commonly-owned U.S. patent application Ser. No. 11/454,756, filed on Jun. 16, 2006, entitled "Cream Cheese Products and Methods of Making the Same," the entirety of which hereby is incorporated herein by reference.

FIG. 2 is a flow chart showing another example [200] of the process [100] illustrated in FIG. 1. The entireties of the discussions herein of the processes [100, 300] in connection with FIGS. 1 and 3 are deemed to be incorporated into this discussion of the process [200] in connection with FIG. 2.

The process [200] starts at step [205]. In step [210], a dilute aqueous liquid acid whey protein composition containing acid whey proteins is provided, having a total solids concentration of less than about seven percent (7%) by weight, or within a range of between about seven percent (7%) by weight and about five percent (5%) by weight. Further, the dilute aqueous liquid acid whey protein composition contains acid whey protein at a concentration of less than about three percent (3%) by weight.

Step [220] of the process [200] includes filtering the dilute aqueous liquid acid whey protein composition, forming a concentrated aqueous liquid acid whey protein composition having a total solids concentration within a range of between about twelve percent (12%) by weight and about eight percent (8%) by weight; or within a range of between about twelve percent (12%) by weight and about ten percent (10%) by weight. In the filtering, acid whey proteins present in the dilute aqueous liquid acid whey protein composition are collected into a more concentrated composition, which is segregated from another composition also formed, that includes water. In an example, the filtering of the dilute aqueous liquid acid whey protein composition at step [220] may include carrying out step [221] wherein the filtering of the dilute aqueous liquid acid whey protein composition is carried out utilizing a membrane. The membrane filtering results in the forming of a filtration permeate containing water and other molecules having relatively low molecular weights, and the forming of a filtration retentate containing acid whey proteins and other molecules having relatively high molecular weights. Suitable membrane filtration processes that may be utilized include, as examples, ultrafiltration, microfiltration, reverse osmosis, and nanofiltration. Where step [221] includes subjecting the dilute aqueous liquid acid whey protein composition to ultrafiltration, for example, the filtration permeate may include water, lactose and mineral ash; and the acid whey proteins may become significantly more concentrated in the filtration retentate. As another example, the temperature of the dilute aqueous liquid acid whey protein composition may be adjusted to a temperature suitable for carrying out the filtration, such as within a range of between about seventy degrees Fahrenheit (70° F.) and about eighty degrees Fahrenheit (80° F.). Further, for example, the filtering of the dilute aqueous liquid acid whey protein composition at step [220] may then include carrying out step [222] wherein the filtration retentate is recovered as being the concentrated aqueous liquid acid whey protein composition. As an example, the concentrated aqueous liquid denatured acid whey protein composition may contain a concentration of denatured acid whey protein solids of at least about three percent (3%) by weight, or within a range of between about three percent (3%) by weight and about four percent (4%) by weight, or within a range of between about three percent (3%) by weight and about five percent (5%) by weight. The filtration permeate may, for example, be further subjected to a reverse osmosis process and then utilized as non-potable water.

At step [230] of the process [200], the concentrated aqueous liquid acid whey protein composition and an edible caustic composition are combined together in suitable proportions to result in a substantially neutral pH. For example, the edible caustic compositions discussed earlier in connection with step [130] of the process [100] may be utilized. As an example, forming the concentrated aqueous liquid acid whey protein composition at step [220] may include forming the concentrated aqueous liquid acid whey protein composition as having a pH within a range of between about 4.6 and about 4.7; and then carrying out step [230] may include combining together the concentrated aqueous liquid acid whey protein composition and the edible caustic composition in suitable proportions so that a pH of the concentrated aqueous liquid acid whey protein composition may be adjusted to be within a range of between about 6.5 and about 7.5, or within a range of between about 6.5 and about 7.0, or may be adjusted to be about 7.0. In an example, step [230] may be carried out to so adjust the pH of the concentrated aqueous liquid acid whey protein composition in this manner prior to carrying out denaturing of the acid whey proteins at an elevated temperature in step [240] as discussed below. Heating the concentrated aqueous liquid acid whey protein composition to an elevated temperature in connection with the denaturing at step [240] without having adjusted the pH to be substantially neutral may produce denatured acid whey proteins that will not coagulate in the curd at step [265] and may not be retained in the curd at step [270]. Heating the concentrated aqueous liquid acid whey protein composition to an elevated temperature in connection with the denaturing at step [240] without having so adjusted the pH may also result in an unacceptable level of acid-induced degradation of the concentrated aqueous liquid acid whey protein composition. As an example, one (1) pound ("lb.") of sodium hydroxide may be combined with each one thousand (1,000) pounds of the concentrated aqueous liquid acid whey protein composition in carrying out step [230].

Step [240] of the process [200] includes denaturing the acid whey proteins in the concentrated aqueous liquid acid whey protein composition at an elevated temperature to form a concentrated aqueous liquid denatured acid whey protein composition. For example, the denaturing of the acid whey proteins in the concentrated aqueous liquid acid whey protein composition at step [240] may include carrying out step [241] which includes carrying out the denaturing by heating the concentrated aqueous liquid acid whey protein composition to a temperature within a range of between about one hundred and seventy-five degrees Fahrenheit (175° F.) and about one hundred and eighty-five degrees Fahrenheit (185° F.), or to about one hundred and eighty degrees Fahrenheit (180° F.). As an example, step [241] may include subjecting the concentrated aqueous liquid acid whey protein composition to a forty (40) minute vat pasteurization, wherein the concentrated aqueous liquid acid whey protein composition is gradually heated to a temperature of one hundred and eighty degrees Fahrenheit (180° F.) and then held at that temperature for about fifteen (15) minutes.

In an example, following the heating of the concentrated aqueous liquid acid whey protein composition to an elevated temperature at step [241], then step [240] may further include reducing the temperature of the concentrated aqueous liquid acid whey protein composition, and then subjecting the concentrated aqueous liquid acid whey protein composition to shear in order to make the consistency of the concentrated aqueous liquid acid whey protein composition more uniform. For example, following the heating at step [241], the temperature of the concentrated aqueous liquid acid whey protein composition may be reduced to a temperature within a range of between about sixty degrees Fahrenheit (60° F.) and about ninety degrees Fahrenheit (90° F.); or to a temperature within a range of between about seventy degrees Fahrenheit (70° F.) and about eighty degrees Fahrenheit (80° F.); or to a temperature of about eighty degrees Fahrenheit (80° F.). In another example, step [240] may further include subjecting the concentrated aqueous liquid acid whey protein composition to shear in a continuous process, for example, by passing it through a shear pump. In an example, the shear pump may be configured to operate at about three thousand and six hundred (3,600) revolutions per minute (rpm) with a composition throughput of about ten (10) gallons per minute.

In an example, after completing step [240] the concentrated aqueous liquid denatured acid whey protein composition may be combined with an edible acid and then heated to an elevated temperature to form a milk protein curd and a whey. In this example, the shearing step discussed above in connection with step [240] may be omitted. Any of the edible acids that were earlier discussed in connection with step [165] may be utilized. For example, a suitable concentration of an edible acid may be combined with the concentrated aqueous liquid acid whey protein composition to reduce its pH to within a range of between about 5.5 and about 6.0. Further, for example, the temperature of the concentrated aqueous liquid acid whey protein composition may be raised to about one hundred and eighty-five degrees Fahrenheit (185° F.). The milk protein curd may then be separated from the whey, for example, utilizing a ball-deck gyratory sifter. In operation of such a sifter, for example, the milk protein curd may stick to the rubber balls of the ball deck, from which the milk protein curd may then be recovered. As another example, the milk protein curd may be separated from the whey by filling the concentrated aqueous liquid denatured acid whey protein composition into porous bags, hanging up the porous bags, and allowing the whey to drain off by gravity. Carrying out the process [200] according to this example yields a milk protein curd that may be combined with cream, cream powder, or another butterfat or vegetable fat ingredient such as one of the edible vegetable oils discussed earlier in connection with step [150] of the process [100], to form ricotta cheese or a ricotta cheese-type product. The milk protein curd produced according to this example may have a particularly delicate, smooth texture; and the resulting ricotta cheese or a ricotta cheese-type product may likewise have such a texture. Suitable ball-deck gyratory sifters may be commercially available from Sweco, having a business address at 8029 U.S. Highway 25, Florence, Ky. 41022.

The process [200] further includes steps [250], [255], [260], [265], [270] and [275], being respectively the same steps as and being carried out in the same manner as discussed in connection with steps [150], [155], [160], [165], [170] and [175] shown in FIG. 1. Accordingly, at step [250] of the process [200], a milk composition may be provided in the same manner as discussed earlier with regard to step [150] of the process [100], being a liquid composition having ingredients that include butterfat and substantial concentrations of native casein and whey proteins. Further, step [255] of the process [200] may include combining together the milk composition and the concentrated aqueous liquid denatured acid whey protein composition formed at step [240] in the same manner as discussed earlier with regard to step [155] of the process [100], forming a dairy mix containing butterfat and a protein composition including native casein and whey proteins and denatured acid whey proteins. In addition, at step [260] of the process [200] the dairy mix may be inoculated, in the same manner as discussed earlier with regard to step [160] of the process [100], with live and active lactic acid-producing bacteria. Also, in step [265] of the process [200], the lactic acid-producing bacteria may be cultured in the dairy mix in the same manner as discussed earlier with regard to step [165] of the process [100], forming a curd and a whey. Additionally, at step [270] of the process [200], the curd may be separated from the whey in the same manner as discussed earlier with regard to step [170] of the process [100]. Furthermore, at step [275] of the process [200], the curd may be recovered as a cheese product in the same manner as discussed earlier with regard to step [175] of the process [100]. As examples, the cheese product may be a cream cheese, a cream cheese product, a yogurt, a Baker's cheese, or a ricotta cheese. Further, for example, the cheese product may be a cream cheese in compliance with the Standard of Identity for Cream Cheese as codified by the United States Food & Drug Administration at Title 21 Code of Federal Regulations Section 133.133. The process [200] may then end at step [285].

As another example, the culturing of the lactic acid-producing bacteria in the dairy mix at step [265] may include forming the whey as acid whey; and providing the dilute aqueous liquid acid whey protein composition at step [210] may include carrying out step [280], wherein: the acid whey is recovered, for example from the holding tank, after separating the curd from the whey at step [270]; and the recovered acid whey is then recycled at step [210] as being the dilute aqueous liquid acid whey protein composition containing acid whey proteins. In another example, the combining together of the milk composition and the concentrated aqueous liquid denatured acid whey protein composition at step [255] may be at least semi-continuously carried out. Further in that example, the forming of the concentrated aqueous liquid denatured acid whey protein composition at step [240] may also include at least semi-continuously: at step [210] providing the dilute aqueous liquid acid whey protein composition, at step [220] filtering the dilute aqueous liquid acid whey protein composition to form the concentrated aqueous liquid acid whey protein composition, at step [230] combining together the concentrated aqueous liquid acid whey protein composition and the edible caustic composition, and at step [240] denaturing the acid whey proteins at an elevated temperature.

In an example, the process [200] may include controlling the time period over which the dilute aqueous liquid acid whey protein composition provided at step [210] is denatured at step [240]. For example, a point in time when the dilute aqueous liquid acid whey protein composition is provided at step [210] may be designated as "[T1]". Further, for example, another point in time at which denaturing of acid whey proteins has been completed to form the concentrated aqueous liquid denatured acid whey protein composition at step [240] may be designated as "[T2]". As an example, a time period between T1 and T2 may be controlled to be within about thirty (30) minutes and about five (5) hours. Controlling the time period between T1 and T2 in the process [200] may, as an example, serve to stabilize the acid whey protein compositions before their acid-induced degradation can cause them to become rancid, spoiled and unusable. In an example where the process [200] includes recovering the acid whey at step [280], T1 may be defined as the point in time when the acid whey is separated from the curd at step [270].

FIG. 3 is a flow chart showing another example [300] of the process [100] illustrated in FIG. 1. The entireties of the discussions herein of the processes [100, 200] in connection with FIGS. 1-2 are deemed to be incorporated into this discussion of the process [300] in connection with FIG. 3.

The process [300] starts at step [305]. At step [310], a dilute aqueous liquid acid whey protein composition containing acid whey proteins is provided in the same manner as discussed above in connection with steps [110, 210] of the processes [100, 200]. Then at step [320], the dilute aqueous liquid acid whey protein composition is filtered, thereby forming a concentrated aqueous liquid acid whey protein composition containing acid whey proteins in the same manner as discussed above in connection with steps [120, 220] of the processes [100, 200]. At step [330] of the process [300], the concentrated aqueous liquid acid whey protein composition and an edible caustic composition are combined together in suitable proportions to result in a substantially neutral pH in the same manner as discussed above in connection with steps [130, 230] of the processes [100, 200]. Step [340] of the process [300] includes heating the concentrated aqueous liquid acid whey protein composition to an elevated temperature to denature the acid whey proteins, forming a concentrated aqueous liquid denatured acid whey protein composition in the same manner as discussed above in connection with steps [140, 240] of the processes [100, 200].

In step [350] of the process [300], a milk composition is provided in the same manner as discussed earlier with regard to steps [150, 250] of the processes [100, 200], being a liquid composition having ingredients that include butterfat and substantial concentrations of native casein protein and native whey protein, wherein the liquid composition includes one or more sources of such butterfat, native casein protein and whey protein components, examples of sources including liquid, condensed, dry or reconstituted raw-, whole-, reduced-fat- or skim-milk, or cream. As an example, these sources may be derived from cow milk. Among these sources are, as examples: raw milk, cream, whole milk, reduced-fat milk, skim milk, non-fat dry milk ("NFDM"), dry cream, dry whole milk, dry reduced-fat milk, dry skim milk, condensed cream, condensed whole milk, condensed reduced-fat milk, condensed skim milk, and reconstituted milk. In another example, step [350] may include providing the milk composition as being condensed skim milk; and step [375] of the process [300] then may include recovering the curd as Baker's cheese. Further in that example, step [350] may include providing the milk composition as including milk protein concentrate ("MPC") added to the condensed skim milk in order to increase the yield of Baker's cheese. As a further example, step [350] may include providing the milk composition as including whole milk, condensed skim milk, cream, and NFDM; and step [375] of the process [300] then may include recovering the curd as cream cheese.

Step [355] of the process [300] includes combining together the milk composition and the concentrated aqueous liquid denatured acid whey protein composition in the same manner as discussed earlier with regard to steps [155, 255] of the processes [100, 200], forming a dairy mix containing butterfat and a protein composition including native casein and whey proteins and denatured acid whey proteins. For example, step [355] may include combining together the milk composition and the concentrated aqueous liquid denatured acid whey protein composition formed at step [340] in suitable proportions so that denatured acid whey proteins constitute between about five percent (5%) by weight and about ten percent (10%) by weight of the protein composition in the dairy mix. As an example, combining together an amount of the concentrated aqueous liquid denatured acid whey protein composition to constitute about four percent (4%) to five percent (5%) by liquid weight of the dairy mix may be suitable to form a dairy mix wherein the denatured acid whey proteins constitute between about five percent (5%) by weight and about ten percent (10%) by weight of the protein composition, or about six percent (6%) by weight of the protein composition. The concentrated aqueous liquid denatured acid whey protein composition that is formed at step [340] is combined together with the milk composition at step [355] without converting the concentrated aqueous liquid denatured acid whey protein composition to a dry form.

At step [360] of the process [300], the dairy mix is inoculated, in the same manner as discussed earlier with regard to steps [160, 260] of the processes [100, 200], with live and active lactic acid-producing bacteria. As an example, step [360] may include inoculating the dairy mix with live and active mesophilic lactic acid-producing bacteria being suitable for culturing the dairy mix to form the curd as a cheese product. In another example, step [360] may include inoculating the dairy mix with live and active thermophilic lactic acid-producing bacteria being suitable for culturing the dairy mix to form the curd as a cheese or yogurt product. In a further example, step [360] may include inoculating the dairy mix with live and active mesophilic lactic acid-producing bacteria and live and active thermophilic lactic acid-producing bacteria.

In step [365] of the process [300], the lactic acid-producing bacteria are cultured in the dairy mix in the same manner as discussed earlier with regard to steps [165, 265] of the processes [100, 200], forming a curd and a whey. At step [370] of the process [300], the curd is separated from the whey in the same manner as discussed earlier with regard to steps [170, 270] of the processes [100, 200]. In step [375] of the process [300], the curd is recovered as a cheese product in the same manner as discussed earlier with regard to steps [175, 275] of the processes [100, 200]. As examples, the cheese product may be a cream cheese, a cream cheese product, a yogurt, Baker's cheese, or ricotta cheese. Further, for example, the cheese product may be a cream cheese in compliance with the Standard of Identity for Cream Cheese as codified by the United States Food & Drug Administration at Title 21 Code of Federal Regulations Section 133.133. The process [300] may then may end at step [385].

As another example, the culturing of the lactic acid-producing bacteria in the dairy mix at step [365] may include forming the whey as acid whey; and providing the dilute aqueous liquid acid whey protein composition at step [310] may include carrying out step [380], wherein: the acid whey is recovered, for example from the holding tank, after separating the curd from the whey at step [370]; and the recovered acid whey is then recycled at step [310] as being the dilute aqueous liquid acid whey protein composition containing acid whey proteins. In another example, the combining together of the milk composition and the concentrated aqueous liquid denatured acid whey protein composition at step [355] may be at least semi-continuously carried out. Further in that example, the forming of the concentrated aqueous liquid denatured acid whey protein composition at step [340] may also include at least semi-continuously: at step [310] providing the dilute aqueous liquid acid whey protein composition, at step [320] filtering the dilute aqueous liquid acid whey protein composition to form the concentrated aqueous liquid acid whey protein composition, at step [330] combining together the concentrated aqueous liquid acid whey protein composition and the edible caustic composition, and at step [340] denaturing the acid whey proteins at an elevated temperature.

In an example, the process [300] may include controlling the time period over which the dilute aqueous liquid acid whey protein composition provided at step [310] is denatured at step [340]. For example, a point in time when the dilute aqueous liquid acid whey protein composition is provided at step [310] may be designated as "[T1]". Further, for example, another point in time at which denaturing of acid whey proteins has been completed to form the concentrated aqueous liquid denatured acid whey protein composition at step [340] may be designated as "[T2]". As an example, a time period between T1 and T2 may be controlled to be within about thirty (30) minutes and about five (5) hours. Controlling the time period between T1 and T2 in the process [300] may, as an example, serve to stabilize the acid whey protein compositions before their acid-induced degradation can cause them to become rancid, spoiled and unusable. In an example where the process [300] includes recovering the acid whey at step [380], T1 may be defined as the point in time when the acid whey is separated from the curd at step [370].

Example 1

Concentrated aqueous liquid denatured acid whey protein is provided, in an amount of five thousand pounds (5,000 lbs.), having a denatured acid whey concentration of about three percent (3%) by weight and a total solids concentration of about ten percent (10%) by weight, so that about thirty-four percent (34%) of the total solids is denatured acid whey protein. A milk composition is formulated by blending together the following ingredients: sixty thousand pounds (60,000 lbs.) of Whole Milk (containing 4% butterfat by weight, 12.76% total solids by weight, and 2.85% protein by weight), and five thousand pounds (5,000 lbs.) of Condensed Skim Milk (containing 0.17% butterfat by weight, 33.44% total solids by weight, and 12.36% protein by weight), and twenty-eight thousand pounds (28,000 lbs.) of Cream (containing 42.66% butterfat by weight, 47.88% total solids by weight, and 1.76% protein by weight), and twenty-two thousand pounds (22,000 lbs.) of water. The concentrated aqueous liquid denatured acid whey protein composition and the milk composition are combined together, thoroughly mixed with gentle agitation to form a dairy mix, and heated to one hundred and thirty degrees Fahrenheit (130° F.). The dairy mix is subjected to a two stage homogenization, including a second stage at 500 PSI followed by a first stage at 2,000 PSI. The dairy mix is then pasteurized by heating to a temperature of 161.5° F. for sixteen seconds. The pasteurized dairy mix is cooled to a temperature within a range of between about eighty-two degrees Fahrenheit (82° F.) and about eighty-four degrees Fahrenheit (84° F.), and then inoculated with 7,210 grams of Chr. Hansen DSG-2000-10 live and active lactic acid-producing bacteria, being equivalent to five hundred and fifteen (515) grams of bacteria per one thousand (1,000) gallons of the milk composition. The dairy mix is then subjected to gentle agitation for 15 minutes. The pH of the dairy mix is monitored until it is reduced to 4.70 after the bacteria have been cultured in the dairy mix for a time period within a range of between about eight (8) hours and about ten (10) hours. The dairy mix is then heated to one hundred and seventy degrees Fahrenheit (170° F.) and sent to a degassing tank. The dairy mix is then introduced into a centrifugal separator, which separates the curd from the whey. The curd is then blended with an amount of a gum blend stabilizer calculated as 0.27% of the weight of the curd; and an amount of salt calculated as 0.9% of the weight of the curd. The curd is then passed through a homogenizer and there subjected to a two-stage homogenization including a second stage homogenization at five hundred (500) PSI followed by a first stage homogenization at one thousand (1,000) PSI. The curd, constituting about thirty-three percent (33%) by weight of the dairy mix, is then packed as a cream cheese product. The whey, constituting about sixty-seven percent (67%) by weight of the dairy mix, is sent to a holding tank and then sent through a plate heat exchanger to balance its temperature within a range of between about seventy degrees Fahrenheit (70° F.) and about eighty degrees Fahrenheit (80° F.). The whey is then pumped through an ultrafiltration unit. The retentate is combined with about four pounds (4 lbs.) to about six pounds (6 lbs.) of glacial sodium hydroxide (NaOH) to adjust the pH to within a range of between about 6.7 and about 7.0. The retentate is then denatured by heating to a temperature of about one hundred and eighty degrees Fahrenheit (180° F.) to form a concentrated aqueous liquid denatured acid whey protein composition having an acid whey protein concentration within a range of between about three percent (3%) by weight and about four percent (4%) by weight. The concentrated aqueous liquid denatured acid whey protein composition is then recycled to the process at the beginning of this Example. The ultrafiltration permeate is sent through a reverse osmosis apparatus to collect remaining solids as retentate, and the permeate is end-used as non-potable water.

While the present invention has been disclosed in a presently preferred context, it will be recognized that the present teachings may be adapted to a variety of contexts consistent with this disclosure and the claims that follow. For example, the process shown in the figures and discussed above can be adapted in the spirit of the many optional parameters described, to yield a variety of cheese products.

What is claimed is:

1. A process, comprising:
    providing a dilute aqueous liquid acid whey protein composition having a pH being equal to or less than about 5.1 and containing acid whey proteins;
    filtering the dilute aqueous liquid acid whey protein composition, forming a concentrated aqueous liquid acid whey protein composition containing acid whey proteins;
    combining together the concentrated aqueous liquid acid whey protein composition and an edible caustic composition in suitable proportions to increase the pH to a substantially neutral pH being within a range of between about 6.5 and about 7.5;

heating the concentrated aqueous liquid acid whey protein composition having the substantially neutral pH to an elevated temperature to denature the acid whey proteins, forming a concentrated aqueous liquid denatured acid whey protein composition;

providing a milk composition containing butterfat and substantial concentrations of native casein and whey proteins;

combining together the milk composition and the concentrated aqueous liquid denatured acid whey protein composition, forming a dairy mix containing butterfat and a protein composition including native casein and whey proteins and denatured acid whey proteins;

inoculating the dairy mix with lactic acid-producing bacteria;

culturing the lactic acid-producing bacteria in the dairy mix, forming a curd and a whey;

separating the curd from the whey; and recovering the curd as a cheese product.

2. The process of claim 1, wherein the culturing of the lactic acid-producing bacteria in the dairy mix includes forming the whey as acid whey; and wherein providing the dilute aqueous liquid acid whey protein composition includes recovering the acid whey after separating the curd from the acid whey, and recycling the recovered acid whey as being the dilute aqueous liquid acid whey protein composition containing acid whey proteins.

3. The process of claim 1, wherein the providing of the dilute aqueous liquid acid whey protein composition includes providing the dilute aqueous liquid acid whey protein composition as having a total solids concentration of less than about seven percent (7%) by weight.

4. The process of claim 1, wherein the forming of the concentrated aqueous liquid acid whey protein composition includes filtering the dilute aqueous liquid acid whey protein composition so that the concentrated aqueous liquid acid whey protein composition has a total solids concentration within a range of between about twelve percent (12%) by weight and about eight percent (8%) by weight.

5. The process of claim 1, wherein the filtering of the dilute aqueous liquid acid whey protein composition includes: membrane filtering the dilute aqueous liquid acid whey protein composition, forming a filtration permeate and forming a filtration retentate containing acid whey proteins; and recovering the filtration retentate as being the concentrated aqueous liquid acid whey protein composition.

6. The process of claim 1, wherein the forming of the concentrated aqueous liquid acid whey protein composition includes forming the concentrated aqueous liquid acid whey protein composition as having the pH being within a range of between about 4.6 and about 4.7, and wherein the combining together of the concentrated aqueous liquid acid whey protein composition and the edible caustic composition increases the pH of the concentrated aqueous liquid acid whey protein composition to being within a range of between about 6.5 and about 7.0.

7. The process of claim 1, wherein the forming of the concentrated aqueous liquid denatured acid whey protein composition includes heating the concentrated aqueous liquid acid whey protein composition to a temperature within a range of between about one hundred and seventy-five degrees Fahrenheit (175° F.) and about one hundred and eighty-five degrees Fahrenheit (185° F.).

8. The process of claim 1, wherein the providing of the milk composition includes providing the substantial concentrations of native casein and whey proteins as being at least as large as are concentrations of native casein and whey proteins in reduced-fat-milk.

9. The process of claim 1, wherein the providing of the milk composition containing butterfat and substantial concentrations of native casein and whey proteins includes providing the milk composition as being condensed skim milk.

10. The process of claim 1, wherein the forming of the dairy mix includes combining together the milk composition and the concentrated aqueous liquid denatured acid whey protein composition in suitable proportions so that denatured acid whey proteins constitute between about five percent (5%) by weight and about ten percent (10%) by weight of the protein composition in the dairy mix.

11. The process of claim 1, wherein the inoculating of the dairy mix includes inoculating the dairy mix with the lactic acid-producing bacteria as being live and active mesophilic lactic acid-producing bacteria, and wherein the forming of the curd includes forming the curd as being cream cheese.

12. The process of claim 1, wherein the inoculating of the dairy mix with lactic acid-producing bacteria includes inoculating the dairy mix with live and active thermophilic lactic acid-producing bacteria being suitable for culturing the dairy mix.

13. The process of claim 12, wherein live and active probiotic lactic acid-producing thermophilic bacteria are combined with the cheese product.

14. The process of claim 2, wherein the inoculating of the dairy mix includes inoculating the dairy mix with the lactic acid-producing bacteria as being live and active mesophilic lactic acid-producing bacteria, and wherein the forming of the curd includes forming the curd as being cream cheese.

15. The process of claim 2, wherein a time period is defined as beginning at a point in time when the dilute aqueous liquid acid whey protein composition is provided, and the time period is defined as ending at another point in time when the denaturing of the acid whey proteins has been completed to form the concentrated aqueous liquid denatured acid whey protein composition; and wherein the time period is controlled to be within a range of between about thirty (30) minutes and about five hours.

16. The cheese product made according to the process of claim 1.

17. Baker's cheese made according to the process of claim 9.

18. The cheese product containing live and active probiotic thermophilic lactic acid-producing bacteria, made according to the process of claim 13.

19. Cream cheese made according to the process of claim 14.

* * * * *